United States Patent Office 2,995,515
Patented Aug. 8, 1961

2,995,515
DRILLING WITH AERATED DRILLING FLUID
Roy A. Bobo, Houston, Tex., assignor to Phillips Petroleum Company, a corporation of Delaware
No Drawing. Filed Oct. 23, 1957, Ser. No. 691,786
4 Claims. (Cl. 252—8.5)

This invention relates to an improved method for drilling with an aerated drilling fluid. In one aspect, the invention relates to a method of improving rotary drilling employing an aerated drilling fluid by including in the drilling fluid a small amount of a material or collecting agent which promotes adherence of froth or air bubbles to the cuttings formed during drilling.

In drilling a well, the conventional procedure is to circulate in the well a drilling liquid or a drilling mud which, as one of its main functions, serves to carry the cuttings away from the bit and to the top of the hole. It has been found that using a light weight drilling fluid results in increased drilling or penetration rates and reduces bit wear, when compared with conventional drilling fluids, thus decreasing drilling costs. Drilling with an aerated drilling mud, i.e., a light weight drilling fluid, is an example of reduced pressure drilling which can be defined as the drilling with a circulating medium whose effective return column (annular) density is less than that of muds which are in common use. Other advantages of aerated mud drilling are that good tests are obtained on all productive zones that are penetrated without resorting to expensive drill stem tests, less horsepower is required for drilling, and wear and tear on equipment are considerably reduced. In aerated mud drilling, both air and drilling liquid or mud are introduced simultaneously into the standpipe.

An object of the invention is to increase the cuttings carrying capacity of an aerated drilling liquid in the drilling of a well. Another object is to provide a process which makes possible increased penetration rates in the drilling of a well using an aerated drilling liquid.

Other objects, as well as aspects and advantages, of my invention will become apparent from the accompanying disclosure.

According to my invention, I provide an improvement in a process of drilling a well with well drilling tools, and during said drilling circulating through the well an aerated drilling liquid that carries cuttings from said well during said drilling, which comprises incorporating in said drilling liquid a heteropolar organic carbon compound collecting agent which increases the adhesion of air bubbles in said aerated drilling liquid to said cuttings formed during the drilling of the well, thereby increasing the cuttings carrying capacity of said aerated drilling liquid.

The term "aerated drilling fluid" is to be understood to mean a drilling fluid which contains air or other gas in compressed condition so as to render the fluid substantially less dense. The term includes all of the conventional drilling fluids, such as oil, water, mud, etc., which have been aerated. However, the use of aerated drilling mud is preferred even though the invention is broadly applicable to aerated drilling fluids of great variation in density.

By "collecting agent" herein is meant those organic carbon compounds which increase the adhesion between air bubbles and the solid to be floated or elevated. Such agents are a type of flotation agent termed collecting agents (see Colloid Chemistry by Alexander, vol. 6, 1946, Rheinhold Publishing Corporation (1946) pages 495 et seq.). The agents applicable are all organic heteropolar molecules. They form a thin coating on the solid cuttings in the well and increase the adhesion of the air bubbles to the cuttings. The amount of the collecting agent can vary widely, but from 0.001 to 0.5 weight percent of the liquid in the drilling fluid is usual.

One class of compounds especially useful as collecting agents are ammonium compounds having the following general formula:

$$R_1-N\equiv R_2$$

wherein $R_1$ represents an aliphatic hydrocarbon radical and $R_2$ is selected from hydrogen and hydrocarbon radicals having a total valence of 3 and X is a halide radical, and wherein the total number of carbon atoms is at least 10 and does not exceed 30. Representative of such compounds are dimethyl cetyl benzyl ammonium chloride, lauryl pyridinium iodide, cetyl trimethyl ammonium bromide, cetyl trimethyl ammonium chloride, lauryl trimethyl ammonium chloride, lauryl trimethyl ammonium iodide, cetyl pyridinium bromide, dimethyl benzyl phenyl ammonium chloride, trimethyl octadecyl ammonium bromide, trimethyl eicosyl ammonium iodide, octadecyl pyridinium bromide, trimethyl octadecyl ammonium chloride, trimethyl dodecyl ammonium bromide, trimethyl dodecyl ammonium iodide, triethyl octadecyl ammonium bromide, triethyl cetyl ammonium bromide, octadecyl pyridinium chloride, octadecyl pyridinium iodide, octadecyl alpha picolinium bromide, octadecyl quinolinium bromide, dodecyl pyridinium bromide, heptadecylamine hydrochloride, hexadecylamine hydrochloride, and dodecylamine hydrochloride.

Another particularly useful collecting agent is dehydroabietylamine. This compound has the formula:

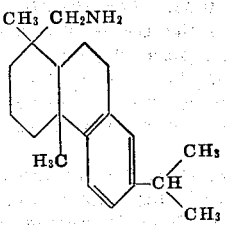

Also useful is the acetate of this compound.

Other useful agents include beta diethylamino ethyl oleyl amide acetate, beta diethylamino ethyl oleyl amide hydrochloride, trimethyl ammonium methyl sulfate, amino oleyl ethylenediamine, cetyl beta hydroxyethyl morpholinium bromide, octadecyl beta hydroxyethyl morpholinium bromide, and beta stearamidophenyl trimethylammonium methyl sulfate.

It is also within the scope of the invention to include in the drilling fluid, especially in a water-based drilling fluid, in addition to the collecting agent, a frothing agent in order to produce smaller air bubbles in the circulating aerated drilling fluid. Any known frothing agent can be used, such as pine oil or cresylic acid.

In oil and gas well drilling, the materials most often penetrated are shales, sandstones, quartzites, cherts, limestones, talc, micas, dolomites, salt and anhydrites, although metal-bearing ores are also sometimes encountered.

By means of my invention, the cuttings carrying capacity of an aerated mud or drilling liquid is increased, and therefore the safe use of lower mud circulatory rates in aerated mud or drilling fluid mixtures are possible. That is, the air to drilling liquid or mud ratio can be increased and therefore the bottom hole drilling pressure is decreased, with consequent increased penetration rates. Moreover, bit life is greatly increased at lower bottom hole pressures.

In a specific embodiment of the invention, a well is drilled with rotary drilling tools through a formation comprising largely quartzites below 900 feet, the drilling liquid is 130 g.p.m. of lime water aerated with 750 m.c.f.d. of air at standard conditions. The water contains 0.05 weight percent of dehydroabietylamine which increases the cuttings carrying capacity of the drilling fluid.

In operation, the collecting agent is dispersed in the drilling liquid before its introduction into the well bore, and during drilling coats the cuttings, increasing their adhesion to the air bubbles.

The following test demonstrates the increased vertical transport velocity of shale particles in an aerated, flowing column of drilling liquid, in this case water.

In this example, a Lucite U-tube having a pin-hole jet at the bottom of one leg was employed. The tube has an inside diameter of one inch and a length of 45 inches. The upper end of both legs enter the bottom of an open Lucite reservoir measuring 6" x 8" x 3". The rubber hose was connected to the pin-hole jet to transmit air thereto. The air supply was controlled by needle valve in the rubber hose. The U-tube apparatus was filled with 2200 cc. of water. Air was adjusted by the needle valve to start liquid circulation. The velocity in the down spout was checked by timing a piece of paper traversing the down spout. A shale particle was dropped in the down spout. The time in seconds was obtained for the particle to travel up the top 34.5 inches of the aerated column. This was repeated ten times for each of three particles.

The shale particles were dipped in a solution of 10 cc. of dehydroabietylamine which was dissolved in 25 cc. of kerosene. The kerosene-amine solution was then added to the water in the U-tube apparatus. Ten runs of each shale particle were again timed over the measured distance of the aerated tube. The velocity of the liquid in the downward leg of the U-tube was again checked by timing the travel of a piece of paper. The apparent velocity of the liquid in the up spout was obtained by timing the travel of a piece of paper up the shale transport interval. These shale particles were carefully wiped dry and weighed.

The results of the tests show that the vertical transport velocities of the particles in the aerated column were increased by about 31 to about 39 percent through the use of the amine. Apparent slip velocities were reduced by 8 to 11 percent. The tests demonstrate that the amine agent increases the transport capacity of a flowing aerated liquid, and will therefore allow a higher ratio of air to liquid to be employed in drilling a well.

As will be evident to those skilled in the art, various modifications of this invention can be made or followed in the light of the foregoing disclosure and discussion without departing from the spirit or scope of the disclosure or from the scope of the claims.

I claim:

1. In a process of drilling a well comprising the steps of drilling the well with drilling tools, and circulating through the well during said drilling an aerated drilling liquid which carries cuttings from the well, the improvement which comprises incorporating in said drilling liquid dehydroabietylamine as a collecting agent in an amount which increases the adhesion of air bubbles in said aerated drilling liquid to said cuttings formed during the drilling of the well, thereby increasing the cuttings carrying capacity of said aerated drilling liquid.

2. A process according to claim 1 wherein there is also incorporated in said drilling liquid a frothing agent which promotes the formation of smaller air bubbles in the circulating aerated drilling fluid.

3. A process according to claim 1 wherein the liquid phase of said aerated water base drilling liquid comprises lime water.

4. A process according to claim 1 wherein the amount of said collecting agent incorporated in said drilling liquid is in the range from about 0.001 to 0.5 weight percent of said drilling liquid.

References Cited in the file of this patent

UNITED STATES PATENTS

| | | |
|---|---|---|
| 2,468,658 | Dyke et al. | Apr. 26, 1949 |
| 2,509,588 | Dawson | May 30, 1950 |
| 2,861,042 | Watkins | Nov. 18, 1958 |

FOREIGN PATENTS

| | | |
|---|---|---|
| 378,318 | Great Britain | Aug. 11, 1932 |

OTHER REFERENCES

McGhee: New Oil Emulsion Speeds West Texas Drilling, article in The Oil and Gas Journal, Aug. 13, 1956, pages 110–112.

Mallory: How Low Solids Muds Can Cut Drilling Costs, article in The Petroleum Engineer, April 1957, pages B 21 to B 24.

Alexander: Colloid Chemistry, pub. 1946, by Reinhold Publ. Corp., N.Y., pages 496, 497, and 502 to 505.

Bobo et al.: Aerated Mud Drilling, article in the Petroleum Engineer, November 1955, pages B46, B49 and B51.